United States Patent [19]

Jarret et al.

[11] Patent Number: 4,504,975
[45] Date of Patent: Mar. 12, 1985

[54] SYSTEM FOR TRANSMITTING DIGITAL SIGNALS OVER AN OPTICAL FIBER

[75] Inventors: Bertrand Jarret; Rose Cordier; Gérard Buffa, all of Conflans-Ste-Honorine, France

[73] Assignee: Lignes Telegraphiques et Telephoniques-L.T.T., Conflans-Ste-Honorine, France

[21] Appl. No.: 457,224

[22] Filed: Jan. 11, 1983

[30] Foreign Application Priority Data

Jan. 15, 1982 [FR] France ................. 82 00611

[51] Int. Cl.³ .............................................. H04B 9/00
[52] U.S. Cl. .................................. 455/608; 328/117; 375/36; 455/619
[58] Field of Search ................ 455/608, 619; 307/360; 328/115, 116, 117; 375/36

[56] References Cited

U.S. PATENT DOCUMENTS 3,991,379 11/1976 Chadwick .
4,017,747 4/1977 Sheng ..................... 307/360
4,229,831 12/1978 Lacher .
4,241,455 12/1980 Eibner .
4,397,042 8/1983 Tsujii et al. ............. 455/608

FOREIGN PATENT DOCUMENTS 2748292 5/1978 Fed. Rep. of Germany .

OTHER PUBLICATIONS

Mahony-"Duobinary Transmission"-Electronics Letters-Sep. 1980, vol. 16, No. 9, pp. 752-753.
Patent Abstracts of Japan, vol. 6, No. 37, Mar. 6, 1982, pp. E97-915, & JP-A-56 154 858 (TEAC).
Nasa Tech. Brief, No. NTN-77/0768, 1976, Houston, Texas (US), "Capacitively-coupled Data Receiver Clipper Stage".

Primary Examiner—Joseph A. Orsino, Jr.
Attorney, Agent, or Firm—Oblon, Fisher, Spivak, McClelland & Maier

[57] ABSTRACT

The receiver of an optical-fiber transmission system comprises a device for restoring each digital signal comprising a first comparator comparing the level of the electric signal with a first reference level and generating a signal when the level of the electric signal is less than the reference level, a second comparator comparing the level of the electric signal with a second reference level and generating a signal when the level of the electric signal is greater than the reference level, and a summator summing the signals generated by the two comparators.

8 Claims, 12 Drawing Figures

FIG_1
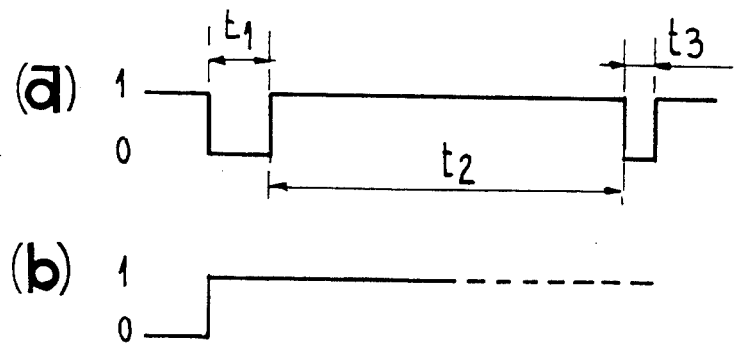
FIG_2
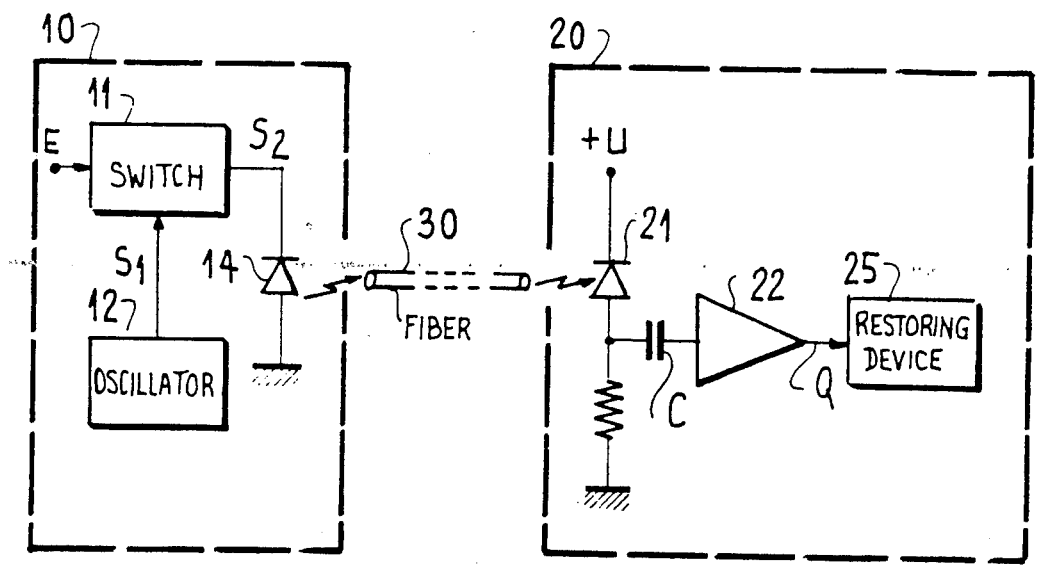

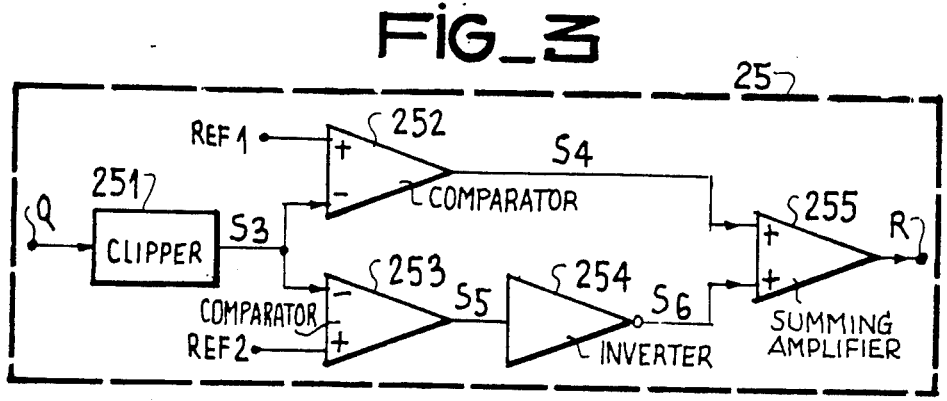
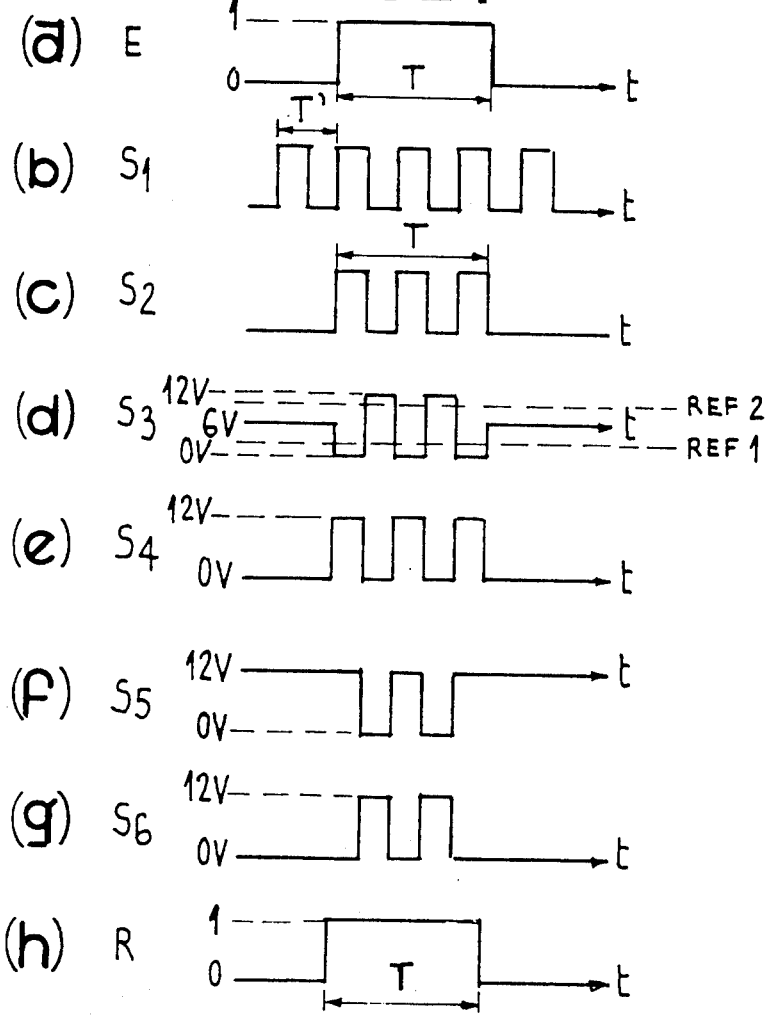

SYSTEM FOR TRANSMITTING DIGITAL SIGNALS OVER AN OPTICAL FIBER

This invention relates generally to systems for transmitting digital signals over optical fibers and relates more particularly to a device for restoring without discrimination either synchronous or asynchronous digital signals or digital signals each formed by an infinite series of logic 1 or 0 states.

Generally, an optical fiber transmission system comprises a transmitter formed of a photoemitting diode and its control and supply circuit, the diode being coupled optically to one end of the optical fiber and a receiver formed of a photodetecting diode coupled to the other end of said fiber and its control circuit.

Furthermore, it is known that the transmission over an optical fiber of digital data or informations, and particularly of infinite series of logic 1 or 0 states, gives problems for restoration of the informations. In fact, in this case, the photoemitting diode emits a continuous optical power into the optical fiber, so that after propagation in the fiber, said continuous power is received by the photodetecting diode which generates an electric current substantially of the same order of magnitude as its so-called dark current; thus, it proves extremely difficult to detect and consequently to restore the digital informations transmitted continuously over the optical fiber.

To resolve this problem, it is known to use on the emission side a switch controlled by each digital information to be transmitted and driven by a modulation signal of given frequency, so that the photoemitting diode is driven by the modulation signal representing said information, and on the reception side a device for restoring or recovering the digital information comprising a diode rectifier followed by a filter.

However, such a restoration device presents disadvantages. In fact, the signal generated by the diode rectifier presents a rise time or a fall time which is too large so that it proves necessary to design a filter particularly appropriate for exactly restoring the digital data. However, this filter is of a complex structure and is consequently expensive. Furthermore, the restoration of synchronous digital informations requires a modulation frequency substantially higher than that of each information, which results in increasing the band width of the receiver, in generating noise and so in obtaining poor sensitivity. Then again, the digital data once detected may present distortions, so that it is indispensable to use an automatic gain control for the photodetecting diode.

The aim of the present invention is to remedy these drawbacks by proposing a device for restoring digital informations or data of any type, that is to say either synchronous or asynchronous data, or data in infinite series of logic 1 or 0 states, which is simple in structure, is inexpensive, ensures perfect restoration of the digital data, needs no automatic gain control and allows the receiver to maintain excellent sensitivity.

To this end, the invention relates to a system for transmitting at least one digital signal over an optical fiber, comprising:

a transmitter of a light radiation into the optical fiber, comprising switching means receiving a modulation signal and being controlled by the digital signal to be transmitted, and a light source emitting the radiation into the fiber and being connected to said switching means;

a receiver of the light radiation after propagation in the fiber, comprising means for converting said radiation received into an electric signal, and a device for restoring the digital signal connected to the converting means; said restoring device including:

first means for comparing the level of said electric signal with a first reference level, generating a first signal when the level of the electric signal is less than said first reference level;

second means for comparing the level of said electric signal with a second reference level, generating a second signal when the level of the electric signal is greater than said second reference level; and means for summing the signals generated by said first and second comparing means, outputting said digital signal.

Other features of the invention will be more apparent upon consideration of the following description and accompanying drawings, wherein:

FIGS. 1a and 1b are respectively two examples of digital data intended to be restored by the device of the invention;

FIG. 2 is a general diagram of a system for transmitting digital informations over an optical fiber;

FIG. 3 is a diagram of one embodiment of the restoring device of the invention; and FIGS. 4a to 4h are diagrams with respect to time illustrating the restoration of a digital information according to the invention.

FIG. 1a shows asynchronous digital data for transmission over an optical fiber. These digital data are formed for example by a bit equal to 0 of a duration $t_1$ equal for example to 4.5 $\mu$s, a bit equal to 1 of a duration $t_2$ equal for example to 491 $\mu$s, and a bit equal to 0 of a duration $t_3$ equal for example to 1 $\mu$s.

FIG. 1b represents another type of digital data formed for example by a continuous and infinite series of bits equal to 1. Of course, this type of digital data could be formed by a continuous and infinite series of bits equal to 0, without departing from the scope of the invention.

FIG. 2 represents a general diagram of a system for transmitting over an optical fiber digital data or informations either synchronous or asynchronous (FIG. 1a) or else of the type formed of continuous and infinite series of logic 0 or 1 states (FIG. 1b).

This transmission system comprises a transmitter 10, a receiver 20 and a monomode or multimode optical fiber 30, serving as transmission line.

The transmitter 10 comprises switching means, formed for example by an analog or logic gate 11, of conventional structure, receiving a modulation signal, of frequency F, supplied by a sinusoidal or square wave oscillator 12. Gate 11 is controlled by the digital information to be transmitted, present at an input E, and is connected at the output to means 14 for emitting light radiation into the fiber 30. These emitting means 14 are formed for example by a light-emitting diode or laser diode, coupled optically to fiber 30.

Diagram 4a shows a digital information present at E, formed for example by a bit equal to 1, and of finite duration T.

Diagram 4b represents the modulation signal $S_1$, for example of the square type, of period T', generated by oscillator 12.

Diagram 4c represents the signal $S_2$ generated by gate 11 when this latter is disabled for example in the presence of a logic state 0 and is enabled in the presence of a logic state 1. Under these conditions, signal $S_2$ represents the modulation signal present during the same period T as that of the digital information E (diagram 4a), and drives the light-emitting diode 14 whose emitted optical power is injected into the fiber.

As is clear from FIG. 2, receiver 20 comprises means 21 for converting into an electric signal the light radiation received after propagation in the optical fiber 30. These means 21 are formed for example by an avalanche photodiode or a PIN type semiconductor diode, whose cathode is connected to a power supply $+U$, and whose anode is connected through a capacitor C to a low noise amplifier 22.

The electric signal detected by the avalanche photodiode 21 corresponds to the modulation signal $S_2$ shown in diagram 4c, and the signal at the Q output of amplifier 22 has an amplitude equal to a normalized value, for example one volt peak to peak.

The output of amplifier 22 is connected to a digital data restoration device 25, in accordance with the invention, which will now be described with reference to FIG. 3.

According to a preferred embodiment, this restoration device 25 comprises a circuit 251, of conventional structure, for clipping the signal detected by the avalanche photodiode 21.

Diagram 4d shows the signal $S_3$ at the output of the clipper circuit 251. This signal $S_3$, of duration T, has a peak to peak amplitude for example equal to $+12$ volts.

The output of the clipper circuit 251 is connected, on the one hand to first means for comparing the level of the clipped electric signal with a first reference level, formed for example by a differential amplifier 252 whose positive terminal is at the reference level $Ref_1$, and, on the other hand, to second means for comparing the level of the clipped electric signal with a second reference level, formed for example by a differential amplifier 253 whose positive terminal is a the reference level $Ref_2$, the negative terminals of the two amplifiers being connected together.

The two reference levels $Ref_1$ and $Ref_2$ are different from each other and are chosen for example symmetrically with respect to a predefined level. Thus for example, as appears from diagram 4d, said predefined level is equal to the mean value of the clipped signal $S_3$, i.e. 6 volts in the example chosen, and the two reference levels $Ref_1$ and $Ref_2$ are respectively equal for example to $+2$ volts and $+10$ volts.

Diagram 4e shows the signal $S_4$ generated by the differential amplifier 252, using for example a so-called positive logic, that is to say that a 0 state corresponds to a zero voltage and a 1 state corresponds to a positive or negative voltage ($\pm 12$ volts in the example chosen). Thus, this signal $S_4$ is in state 0 when the level of the clipped signal is greater than the reference level $Ref_1$ and is in state 1 when the level of said clipped signal is less than said reference level $Ref_1$.

Diagram 4f represents the signal $S_5$ generated by the differential amplifier 253, also using a so-called positive logic. Thus, this signal $S_5$ is in state 1 when the level of the clipped signal is less than the reference level $Ref_2$ and is in state 0 when the level of said clipped signal is greater than said reference level $Ref_2$.

Generally, one of the two comparators generates a signal when the level of the electric signal detected by the photo-detecting diode is less than a first reference level, whereas the other comparator generates a signal when the level of said detected signal is greater than a second reference level different from the first one.

At 254 in FIG. 3 have been shown inverter means, of conventional structure, for inverting the signal $S_5$ generated by the differential amplifier 253.

Diagram 4g represents the signal $S_6$ at the output of inverter 254.

Generally, when the two reference levels are taken respectively from the positive terminals of the two differential amplifiers, the inverting means 254 are disposed at the output of the comparator having the highest reference level. Similarly, when the two reference levels are taken respectively from the negative terminals of the two differential amplifiers, the inverting means 254 are disposed at the output of the comparator having the lowest reference level.

In the case where the positive terminal of the differential amplifier 252 is at the reference level $Ref_1$ and the negative terminal of the differential amplifier 253 is at the reference level $Ref_2$, the two amplifiers 252 and 253 are not followed by an inverter.

Furthermore, in the case where the negative terminal of differential amplifier 252 is at the reference level $Ref_1$ and the positive terminal of differential amplifier 253 is at the reference level $Ref_2$, each of the two amplifiers 252 and 253 is followed by an inverter.

As is shown in FIG. 3, the restoration device 25 also comprises means, formed for example by a summing amplifier 255, for summing the signals generated respectively by the differential amplifier 252 and inverter 254.

Diagram 4h represents the signal at the R output of the summing amplifier 255. This signal R is equal to the sum of signals $S_4$ and $S_6$, thus restoring the original digital information E.

It will be noted that summer 255 of the analog type could be replaced by a logic summer, formed by an OR gate for transmitting a bit equal to 1.

In the case of transmission of a bit equal to 0, with gate 11 enabled in the presence of this bit, and with a first inverter disposed at the output of the differential amplifier 253, the analog summer 255 must be followed by a second inverter. Furthermore, in such a case, the analog summer 255 could be replaced by a logic OR gate.

Also, for transmission of this same bit equal to 0, said first inverter could be disposed at the output of differential amplifier 252, summer 255 not being followed by said second inverter. In this case, the logic summer used would be an AND gate.

It will be noted that the above description refers to a device for restoring a bit equal to 1 emitted for a finite duration T. Of course, the restoration device of the invention also applies to any other type of digital data, and particularly to continuous and infinite series of bits equal to 1 or 0, without departing from the scope of the invention.

What is claimed is:

1. A system for transmitting at least one digital signal over an optical fiber, comprising:
   a transmitter of light radiation into said optical fiber, comprising switching means receiving a modulation signal and being controlled by said digital signal to be transmitted, and a light source emitting said radiation into the fiber and being connected to said switching means;

a receiver of said light radiation after propagation in the fiber, comprising means for converting said radiation into an electic signal, and a device for restoring the digital signal connected to said converting means, said restoring device including;

means for clipping said electric signal, generating a clipped signal;

a first differential amplifier for comparing the level of said clipped signal with a first reference level, generating a first signal when the level of said clipped signal is lower than said first reference level;

a second differential amplifier for comparing the level of said clipped signal with a second reference level, generating a second signal when the level of said clipped signal is greater than said second reference level, said first and second reference levels being respectively on the positive inputs of said first and second differential amplifiers and being different from each other and being determined symmetrically with respect to a predefined level;

inverting means connected at the output of one of said differential amplifiers having the highest reference level; and means for summing the signals generated by one of said differential amplifiers and said inverting means, generating said digital signal.

2. A system for transmitting at least one digital signal over an optical fiber, comprising:

a transmitter of light radiation into said optical fiber, comprising switching means receiving a modulation signal and being controlled by said digital signal to be transmitted, and a light source emitting said radiation into the fiber and being connected to said switching means;

a receiver of said light radiation after propagation in the fiber, comprising means for converting said radiation into an electic signal, and a device for restoring the digital signal connected to said converting means, said restoring device including:

means for clipping said electric signal, generating a clipped signal;

a first differential amplifier for comparing the level of said clipped signal with a first reference level, generating a first signal when the level of said clipped signal is lower than said first reference level;

a second differential amplifier for comparing the level fo said clipped signal with a second reference level, generating a second signal when the level of said clipped signal is greater than said second reference level, said first and second reference levels being respectively on the negative inputs of said first and second differential amplifiers and being different from each other and being determined symmetrically with respect to a predefined level;

inverting means connected at the output of one of said differential amplifiers having the lowest reference level; and means for summing the signals generated by one of said differential amplifiers and said inverting means, generating said digital signal.

3. A system as claimed in claim 1 or 2, wherein said predefined level is equal to the mean value of said clipped signal.

4. A system as claimed in claim 1 or 2, wherein said receiver further comprises means for amplifying said electric signal generated by said converting means.

5. A system as claimed in claim 1 or 2, wherein said digital signal is formed by an infinite series of logic 1 or 0 states.

6. A system as claimed in claim 1 or 2, wherein said digital signals are asynchronous.

7. A system as claimed in claim 1 or 2, wherein said summing means comprise a summer amplifier having two inputs connected respectively to the outputs of said inverting means and one of said differential amplifiers.

8. A system as claimed in claim 1 or 2, wherein said first and second differential amplifiers are connected together by one of their respective inputs.

* * * * *